UNITED STATES PATENT OFFICE.

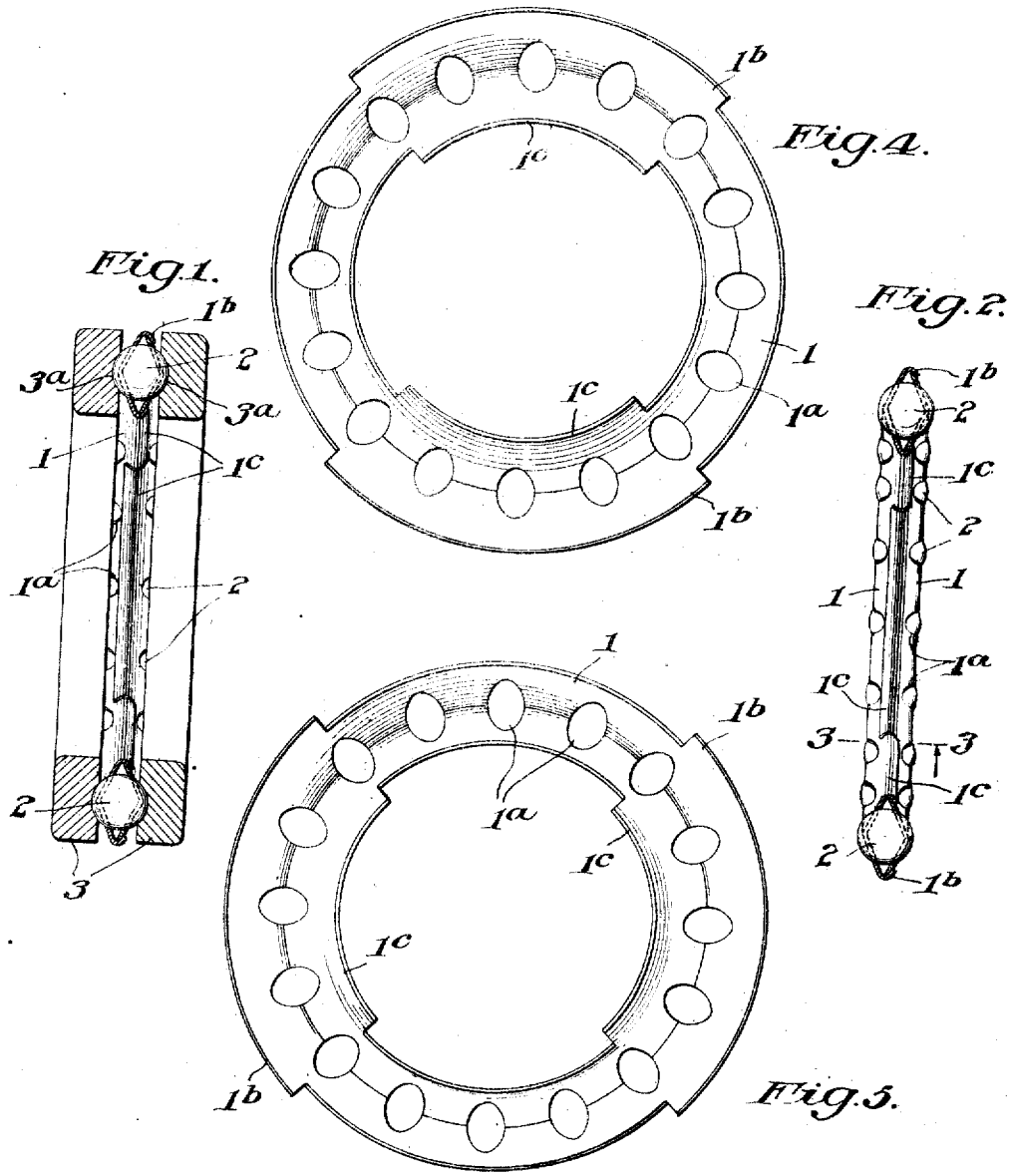
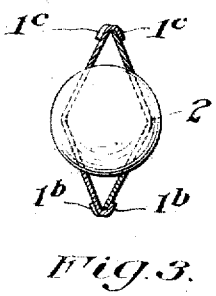

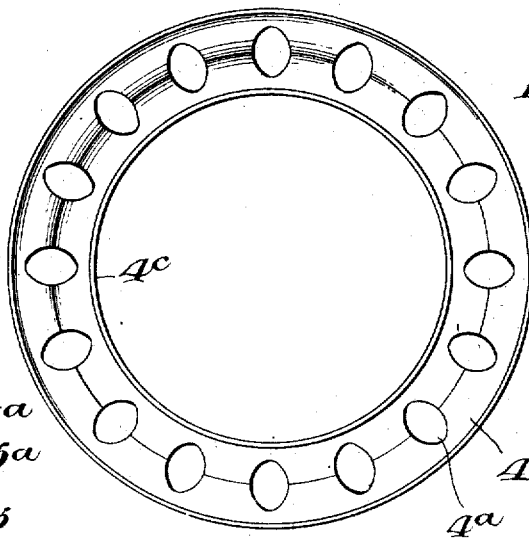
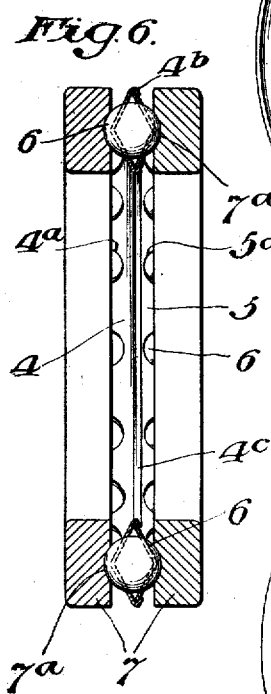
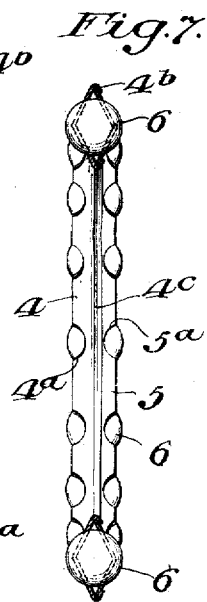
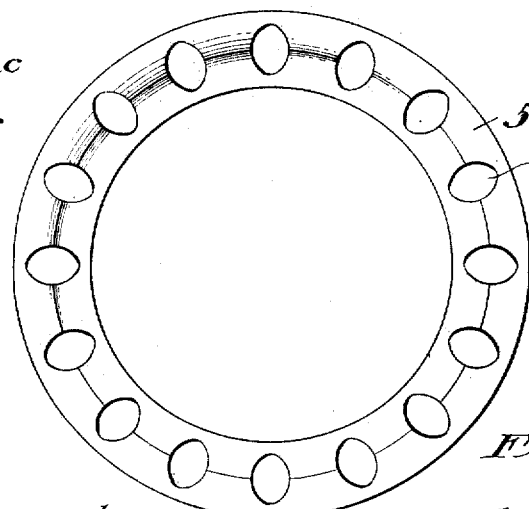
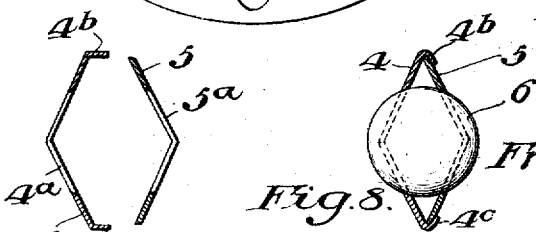

FRANK BEEMER, OF PHILADELPHIA, PENNSYLVANIA, ASSIGNOR TO NICE BALL BEARING COMPANY, OF PHILADELPHIA, PENNSYLVANIA, A CORPORATION OF PENNSYLVANIA.

ANTIFRICTION-BEARING.

1,242,911.  Specification of Letters Patent.  Patented Oct. 16, 1917.

Application filed February 6, 1915. Serial No. 6,427.

*To all whom it may concern:*

Be it known that I, FRANK BEEMER, a citizen of the United States, residing in the city of Philadelphia, county of Philadelphia, and State of Pennsylvania, have invented certain Improvements in Antifriction-Bearings, of which the following is a specification.

My invention relates to ball bearings designed for taking a thrust or carrying a load acting transversely to the plane of the balls, and my leading object is to provide an improved construction combining superior efficiency, simplicity, durability and economy.

The characteristic improvements of my invention reside primarily in a peculiar cage comprising, in its preferred form, a pair of dished rings interlocked in a plane or planes of the balls, which are held between them and project through apertures therein.

In the accompanying drawings, Figure 1 is a sectional view taken through the axis of a bearing embodying my improvements in operative relation; Fig. 2 is a sectional view taken through the axis of a detached bearing ring embodying my improvements; Fig. 3 is an enlarged sectional view taken on the line 3—3 of Fig. 2; Figs. 4 and 5 are complementary dished and apertured rings provided with flanges for locking them together to form a retainer for the balls; Fig. 6 is a sectional view taken through the axis of a bearing embodying a second form of my improvements in operative relation; Fig. 7 is a sectional view taken through the axis of the detached ring shown in Fig. 6; Fig. 8 is an enlarged transverse sectional view of the ring shown in Fig. 7; Figs. 9 and 10 are plan views of dished and apertured rings adapted to be interlocked to provide the ball cage of Fig. 8; and Fig. 11 is a transverse sectional view taken through the rings shown in Figs. 9 and 10 when brought into concentric relation preparatory to assembling the bearing.

The bearing, in the form thereof illustrated in Figs. 1 to 5 inclusive, comprises the complementary dished rings 1 each provided with oval apertures $1^a$, exterior flanges $1^b$ and interior flanges $1^c$, in combination with the balls 2 held in the desired circular relation by the interlocked rings and projecting through the apurtures, the opposite surfaces of the balls projecting beyond the rings being adapted for taking the thrust or transmitting load between bearings 3 containing the circular races $3^a$.

The major axes of the oval apertures $1^a$, before the rings are dished, are coincident with diametral lines drawn through the axes of the rings 1 and these rings are bent similarly away from a plane containing the centers of the ovals, preferably, so that the apertures in the rings when dished shall conform approximately to the ball contours, but it will be understood that this is not essential.

The flanges $1^b$ and $1^c$ are shown as approximate quadrants, so that the projections of each ring will lie between oppositely extending projections of the complementary ring, each projection being turned over the abutting edge of the complementary ring, by which the rings are secured together firmly, with the production of the peculiar retainer of diamond-shaped or approximately oval cross-section.

The complementary rings being alike, they can be stamped out of sheet metal by a single die, dished by the same operation, and fixed together on the balls by the lap joints, without confusion commonly arising where differently constructed parts are to be assembled.

In the form of the bearing illustrated in Figs. 6 to 11 inclusive, complementary dished rings 4 and 5, provided with the respective oval apertures $4^a$ and $5^a$, are fixed together by means of concentric flanges $4^b$ and $4^c$ on the ring 4, such flanges being turned over the concentric edges of the ring 5 to form a cage for retaining the balls 6 which project through the apertures $4^a$ and $5^a$ intersecting the crowns of the rings.

The cage thus formed, of diamond or oval shaped cross-section, retains the balls, which project through the apertures beyond the rings, the bearing ring thus provided being adapted for disposition between bearing rings 7 containing circular races $7^a$ for the balls.

The retainer or retainers thus formed are adapted for holding a lubricant so that it will be taken up by the balls.

The form of the retainer is such that it will not contact with the bearings between which it is used, or if, by reason of wear or imperfect construction, contact is made, such contact will be at the extremities of the "pitch diameter" of the balls or in the bottoms of the grooves in the bearings between which the balls act, where it is least objectionable: that is to say, while in constructions commonly used the lateral movement or vibration of the retainer or the bearings on either side of it causes objectionable frictional contact between the retainer and bearings, resulting in wear and noise, these defects are avoided by my construction due to the fact that the retainer is drawn from its crowns through which the balls project away from the bearings between which it acts, so that if by reason of any fault contact is made, such contact will be between the crowns of the retainer and the bottoms of the races, where least objectionable.

Having described my invention, I claim:

1. A ball bearing comprising a hollow annular retainer that is diamond-shape in cross-section, the inclined sides of the retainer having elliptical apertures with their major axes substantially coincident with diametral lines through the center of the retainer, the apertures in one side being paired with the apertures in the other side to form pockets, and balls disposed in said pockets and projecting through said apertures.

2. A ball bearing comprising a two part retainer composed of oppositely dished rings, each ring having oppositely inclined parts meeting at an angle and extending therefrom inwardly toward the other ring, the two rings being joined at their edges to form a hollow annular retainer, said rings containing elliptical apertures having their major axes substantially coincident with diametral lines through the centers of the rings, the apertures in one ring being paired with the apertures in the other ring to form pockets, and balls disposed in said pockets and projecting through said apertures.

3. A ball bearing comprising a hollow annular retainer that is diamond-shaped in cross section, the inclined sides of the retainer having oblong apertures with their greatest lengths transverse to the retainer, the apertures in one side being paired with the apertures in the other side to form pockets, and balls disposed in said pockets and projecting through said apertures.

In testimony whereof I have hereunto set my name this 30th day of January, 1915, in the presence of the subscribing witnesses.

FRANK BEEMER.

Witnesses:
Jos. G. Denny, Jr.,
C. N. Butler.